United States Patent
Shin (10) Patent No.: US 7,561,364 B2
(45) Date of Patent: Jul. 14, 2009

(54) METHOD AND APPARATUS FOR CONTROLLING DISC DRIVE USING COUNTER-ELECTROMOTIVE FORCE

(75) Inventor: Sang-chul Shin, Osan-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 0 days.

(21) Appl. No.: 11/438,358

(22) Filed: May 23, 2006

(65) Prior Publication Data

US 2006/0209451 A1  Sep. 21, 2006

Related U.S. Application Data

(63) Continuation-in-part of application No. 10/649,779, filed on Aug. 28, 2003, now Pat. No. 7,064,917.

(51) Int. Cl.
  G11B 21/02 (2006.01)
(52) U.S. Cl. .................. 360/75; 360/73.03; 318/459
(58) Field of Classification Search ................. None
  See application file for complete search history.

(56) References Cited

U.S. PATENT DOCUMENTS

| | | | |
|---|---|---|---|
| 5,654,840 A | 8/1997 | Patton et al. | |
| 6,236,527 B1 | 5/2001 | Uchiike et al. | |
| 6,476,996 B1 * | 11/2002 | Ryan | 360/75 |
| 6,700,344 B1 | 3/2004 | Krishnamoorthy et al. | |
| 7,130,255 B2 * | 10/2006 | Smith | 369/53.3 |
| 7,143,002 B2 | 11/2006 | Hirano | |
| 2003/0103286 A1 | 6/2003 | Bi et al. | |
| 2003/0174429 A1 | 9/2003 | Heydt et al. | |
| 2004/0246833 A1 * | 12/2004 | Ehrlich | 369/44.29 |

FOREIGN PATENT DOCUMENTS

| | | |
|---|---|---|
| JP | 05-101573 | 4/1993 |
| JP | 7-6488 | 1/1995 |
| JP | 11-16259 | 1/1999 |
| JP | 2002-208239 | 7/2002 |

OTHER PUBLICATIONS

"Quiescent Active Retract System for Disk File," Nov. 1, 1996, IBM TDB vol. 39, No. 11, pp. 181-182.

Japanese Office Action issued on Oct. 10, 2006 with respect to Japanese Patent Application No. 2003-304115.

(Continued)

*Primary Examiner*—Jason C Olson
(74) *Attorney, Agent, or Firm*—Staas & Halsey LLP (57) ABSTRACT

A method and an apparatus to control a disc drive, and more particularly, a method and an apparatus to control a disc drive using a counter-electromotive force, prevents collision and malfunction of a transducer and a disc by determining external vibrations and magnitude of a shock without installing an additional shock sensor in the disc drive. The method of controlling the disc drive using a counter-electromotive force includes detecting a voltage applied to a spindle motor during a predetermined mode, performing an operation of a value of the counter-electromotive force using the detected spindle motor voltage comparing the value of the counter-electromotive force operated with a predetermined threshold, and when the value of the counter-electromotive force is equal to or larger than the predetermined threshold, controlling a voice coil motor and a spindle motor so that a current mode is stopped and a parking or unloading mode is executed.

16 Claims, 4 Drawing Sheets

OTHER PUBLICATIONS

European Search Report dated Jan. 17, 2006 for European Application No. 03019401.3.

U.S. Appl. No. 11/438,358, filed May 23, 2006, Sang-chul Shin, Samsung Electronics Co., Ltd.

* cited by examiner

METHOD AND APPARATUS FOR CONTROLLING DISC DRIVE USING COUNTER-ELECTROMOTIVE FORCE

CROSS-REFERENCE TO RELATED APPLICATIONS

This application is a Continuation-in-Part of application Ser. No. 10/649,779, filed Aug. 28, 2003 now U.S. Pat. No. 7,064,917.

This application claims the priority of Korean Patent Application No. 2002-51162, filed on Aug. 28, 2002, in the Korean Intellectual Property Office, the disclosure of which is incorporated herein in its entirety by reference.

BACKGROUND OF THE INVENTION

1. Field of the Invention

The present invention relates to a method and an apparatus to control a disc drive, and more particularly, to a method of controlling and an apparatus to control a disc drive using a counter-electromotive force, which prevents collision and malfunction of a transducer and a disc by determining external vibrations and a magnitude of shock without installing an additional shock sensor in the disc drive.

2. Description of the Related Art

A hard disc drive includes a plurality of magnetic transducers which sense a magnetic field and magnetize a single rotating disc or each of a plurality of rotating discs to write and read information on and from the disc. In general, the information is formatted in a plurality of sectors in circular tracks. There is a number of tracks across each surface of a disc. Tracks located above each other on the plurality of rotating discs are grouped into cylinders. Therefore, each track is also defined by a cylinder.

In general, each of the transducers is integrated into a slider incorporated into a head gimbal assembly (HGA). Each HGA is attached to an actuator arm. The actuator arm has a voice coil adjacent to a certain magnetic assembly, together with a voice coil motor. In general, the hard disc drive includes a driving circuit which supplies current used to excite the voice coil motor, and a controller. The excited voice coil motor rotates the actuator arm and moves each of the transducers across surfaces of the discs.

When the information is written or read, there is a feasibility that the hard disc drive performs a seek routine when each of the transducers is moved from one cylinder to another cylinder. During the seek routine, the voice coil motor is excited by a current used to move each of the transducers to a new position on the surface of a disc. Also, the controller executes a servo routine on which each of the transducers is moved to an accurate position of a cylinder with respect to a center of a track.

The hard disc drive is very sensitive to disturbance caused by external shocks. As such, when the disturbance exceeds a tolerance range of the hard disc drive, a malfunction may occur, and when the disturbance is severe, a collision between a transducer and disc surface may occur such that the transducer or disc may be severely damaged.

A well-known technique of protecting a disc drive from disturbance is disclosed in U.S. Pat. No. 6,236,527 titled "Disk Drive with Actuator Load/Unload Controller."

Figure 1:
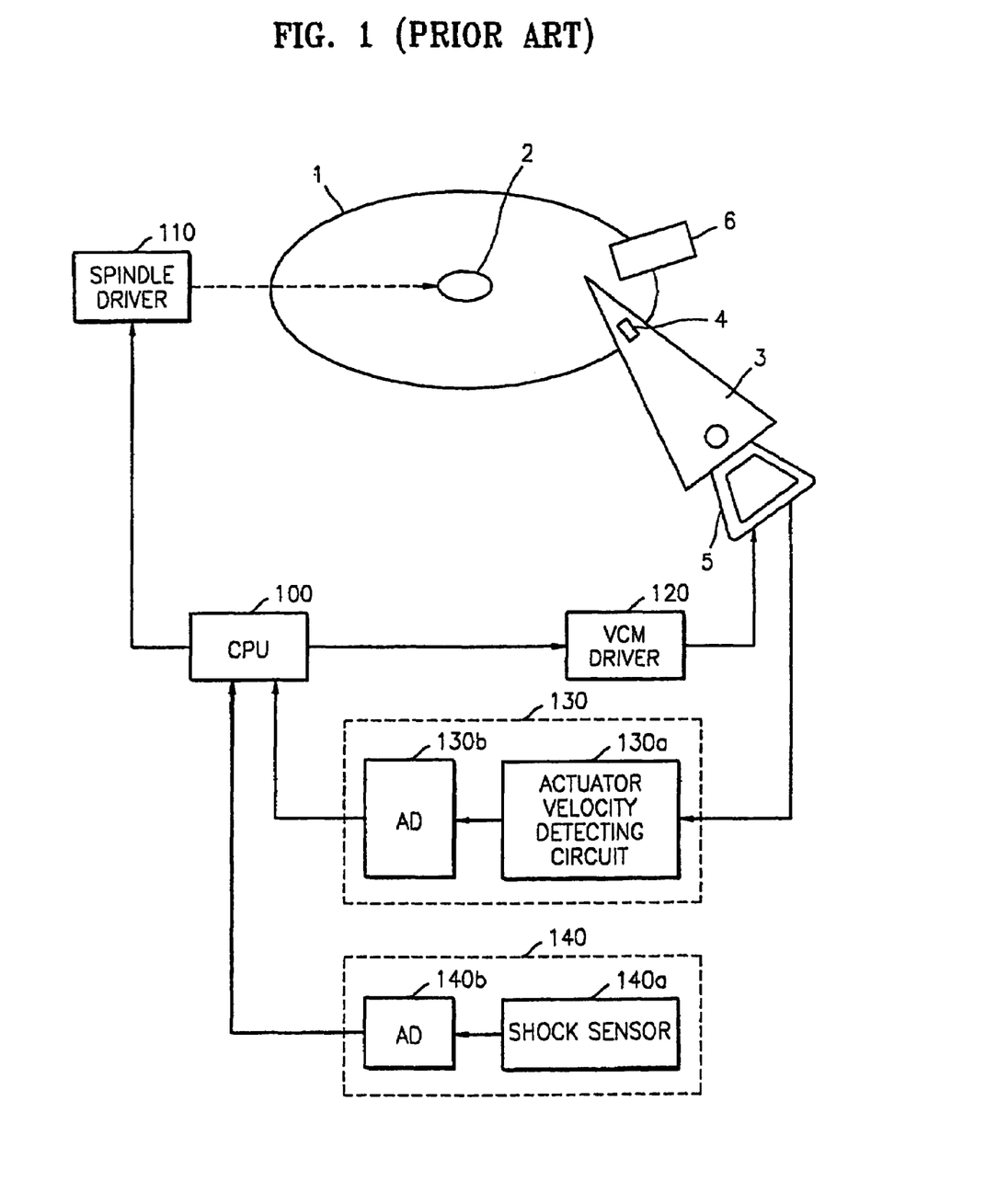
FIG. 1 shows a structure of a conventional disc drive including a shock sensor.

As shown in FIG. 1, the disc drive disclosed in U.S. Pat. No. 6,236,527 includes a shock sensor 140, a ramp 6 as a load/unload mechanism to load/unload a disc 1, A/D converters 130b and 140b which convert an analog signal into a digital signal, an actuator velocity detecting circuit 130a, a CPU 100 which determines and executes commands, a VCM driver 120 which drives an actuator, and a spindle driver 110 which drives a spindle motor 2 to rotate the disc 1. The disc drive also includes the actuator 3 as a position tracking driving unit to write and read data on and from the disc 1, a head/slider 4 that writes data on the disc 1 and reads data from the disc 1, and a VCM coil 5 which drives the actuator 3.

The head/slider 4 that writes and reads data on and from the disc 1 and the VCM coil 5 are both mounted in the actuator 3. The VCM coil 5, together with a permanent magnet (not shown), constitutes a voice coil motor (VCM). The VCM moves the actuator 3, and the spindle motor 2 rotates the disc 1. When the head/slider 4 is unloaded, the ramp 6 supports a head arm. The actuator 3, the VCM, and the ramp 6 constitute a load/unload mechanism that loads/unloads the head/slider 4 onto/from the disc 1. The spindle driver 110 drives the spindle motor 2 according to commands from the CPU 100.

A feature of the disc drive disclosed in the above U.S. Pat. No. 6,236,527 is that after a shock signal input to the disc drive is sensed using the shock sensor 140 during loading/unloading of the head/slider 4, if the value of the sensed shock signal exceeds a threshold, driving of the actuator 3 is stopped, and the head/slider 4 is unloaded by forced driving without control of velocity so that the disc drive is protected from external shocks.

According to the above related art, an additional sensor should be added to sense the magnitude of an outside shock, increasing costs of the disc drive. In addition, only in the loading/unloading mode is the disc drive protected from the external shocks, but the disc drive cannot be protected from smaller disturbance occurring in a high frequency region during the seek and track following modes.

SUMMARY OF THE INVENTION

Accordingly, it is an aspect of the present invention to provide a method and an apparatus to control a disc drive using a counter-electromotive force, in which a magnitude of an external shock applied to the disc drive is determined from the counter-electromotive force by using a signal applied to a spindle motor or a position error signal without an additional shock sensor. A servo mechanism of the disc drive is controlled according to the determined magnitude of the external shock.

Additional aspects and advantages of the invention will be set forth in part in the description which follows and, in part, will be obvious from the description, or may be learned by practice of the invention.

The foregoing and/or other aspects of the present invention are achieved by providing a method of controlling a disc drive using a counter-electromotive force. The method includes detecting a voltage applied to a spindle motor during a predetermined mode, performing an operation of a value of the counter-electromotive force using the detected spindle motor voltage, comparing the value of the counter-electromotive force operated with a predetermined threshold, and when the value of the counter-electromotive force is equal to or larger than the predetermined threshold, controlling a voice coil motor and a spindle motor so that a current mode is stopped and a parking or unloading mode is executed.

The foregoing and/or other aspects of the present invention are achieved by providing a method of controlling a disc drive using a counter-electromotive force of a spindle motor. The method includes detecting a moving distance variation $\Delta Lh/\Delta t$ of a transducer with respect to a variation in time during a predetermined mode, performing an operation of a value of the counter-electromotive force by applying the detected moving distance variation ΔLh/Δt of the transducer with respect to the variation in time to a predetermined counter-electromotive force calculation Equation, comparing the value of the counter-electromotive force with a predetermined threshold, and when the value of the counter-electromotive force is equal to or larger than the predetermined threshold, controlling a voice coil motor and a spindle motor so that a current mode is stopped and a parking or unloading mode is executed.

The foregoing and/or other aspects of the present invention are achieved by providing a disc drive including a disc having a surface, a spindle motor to rotate the disc, a transducer to write and read information in and from the disc, a voice coil motor to move the transducer, and a controller to control the spindle motor and the voice coil motor according to a set mode, and to perform a shock damage prevention process of controlling the voice coil motor and the spindle motor, so that a current mode is stopped and a parking or unloading mode is executed if a counter-electromotive force operation process of performing an operation of a value of a counter-electromotive force using a voltage detected from the spindle motor and the value of the counter-electromotive are equal to or larger than a predetermined threshold value.

The foregoing and/or other aspects of the present invention are achieved by providing a disc drive including a disc having a surface, a spindle motor to rotate the disc, a transducer to write and read information in and from the disc, a voice coil motor to move the transducer, and a controller to control the spindle motor and the voice coil motor according to a set mode, and using a moving distance variation ΔLh/Δt of the transducer with respect to a variation in time detected during the set mode Δt, to perform a shock damage prevention process of controlling the voice coil.

The foregoing and/or other aspects of the present invention are also achieved by providing a disc drive, comprising a disc having a surface; a spindle motor to rotate the disc; a transducer to write and read information in and from the disc; a voice coil motor to move the transducer; and a controller to control the spindle motor and the voice coil motor according to a set mode, and using a moving distance variation ΔLh/Δt of the transducer with respect to a variation in time detected during the set mode Δt, to perform a shock damage prevention process of controlling the voice coil motor and the spindle motor so that a current mode is stopped and a parking or unloading mode is executed if a counter-electromotive force operation process of performing an operation of the value of a counter-electromotive force of the spindle motor using a predetermined counter-electromotive force calculation Equation and the value of the counter-electromotive force of which operation is performed in the counter-electromotive force operation process are equal to or larger than a predetermined threshold value.

The foregoing and/or other aspects of the present invention are achieved by providing a computer readable storage storing at least one program to control a disc drive using a counter-electromotive force according to a process comprising: detecting a voltage applied to a spindle motor during a predetermined mode; performing an operation of the value of the counter-electromotive force using the spindle motor voltage; comparing the value of the counter-electromotive force operated with a predetermined threshold; and when the value of the counter-electromotive force is equal to or larger than the predetermined threshold, controlling a voice coil motor and the spindle motor so that a current mode is stopped and a parking or unloading mode is executed.

The forgoing and/or other aspects of the present invention are achieved by providing a method of controlling a disc drive having a transducer and a disc by using a counter-electromotive force, the method comprising: calculating the counter-electromotive force using a spindle motor voltage or a position error signal without installing an additional shock sensor to sense disturbance in the disc drive; determining a magnitude of an external shock or a magnitude of vibration by the calculated counter-electromotive force; and when the magnitude of an external shock or the magnitude of vibration determined by the counter-electromotive force exceeds a tolerance range of the disc drive, controlling the disc drive so that a current mode is automatically converted into a parking or unloading mode, preventing malfunctions of the disc drive due to collisions between the transducer and the disc.

BRIEF DESCRIPTION OF THE DRAWINGS

The above and/or other aspects and advantages of the invention will become apparent and more readily appreciated from the following description of the preferred embodiment, taken in conjunction with the accompanying drawings of which.

DETAILED DESCRIPTION OF THE PREFERRED EMBODIMENT

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
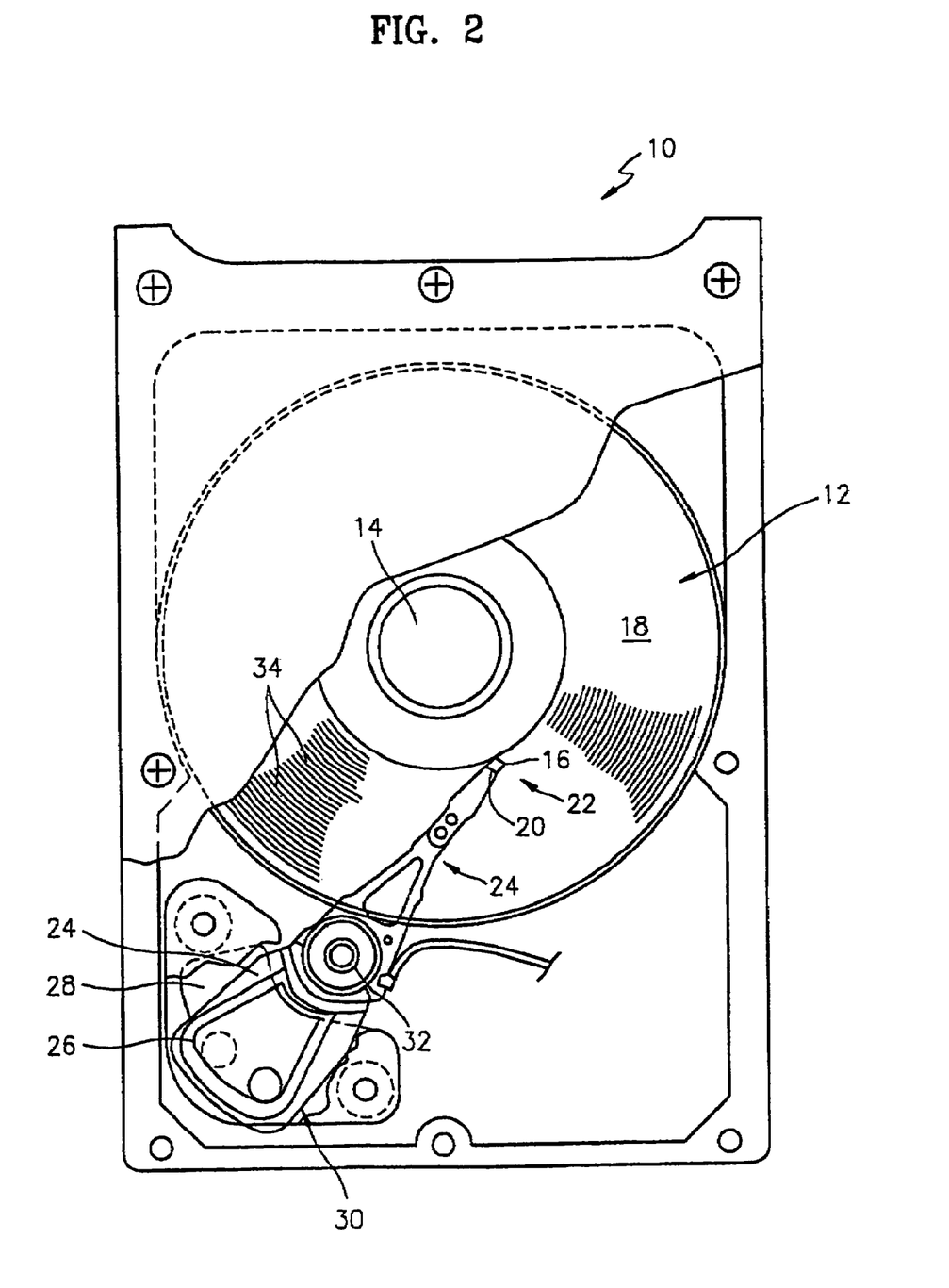
FIG. 2 shows a top view of a disc drive, according to an embodiment of the present invention.

FIG. 2 shows a top view of a disc drive, according to an embodiment of the present invention. A drive 10 includes at least one magnetic disc 12 rotated by a spindle motor 14. The drive 10 further includes a transducer 16 adjacent to a disc surface 18.

The transducer 16 senses a magnetic field and magnetizes the disc 12 to read/write information from/on the rotating disc 12. In general, the transducer 16 is coupled with the disc surface 18. Although a single transducer 16 is shown, the transducer 16 includes a writing transducer to magnetize the disc 12 and a separated reading transducer to sense the magnetic field of the disc 12. The reading transducer includes a magneto-resistive (MR) device.

The transducer 16 may be integrated into a slider 20. The slider 20 is designed to generate an air bearing between the transducer 16 and the disc surface 18. The slider 20 is coupled with a head gimbal assembly (HGA) 22. The HGA 22 is attached to an actuator arm 24 having a voice coil 26. The voice coil 26 allows a voice coil motor (VCM) 30 to be adjacent to a magnetic assembly 28. Current flowing through the voice coil 26 causes a torque used to rotate the actuator arm 24 with respect to a bearing assembly 32. The rotation of the actuator arm 24 causes the transducer 16 to move across the disc surface 18.

Generally, information is stored in a circular track 34 of the disc 12 and, each track 34 includes a plurality of sectors. Each of the sectors includes a data field and an identification field.

The identification field includes a gray code used to identify a sector and a track (a cylinder). The transducer 16 is moved across the disc surface 18 so as to read/write information from/on another track. Moving the transducer 16 across another track is generally referred to as a seek routine.

Figure 3:
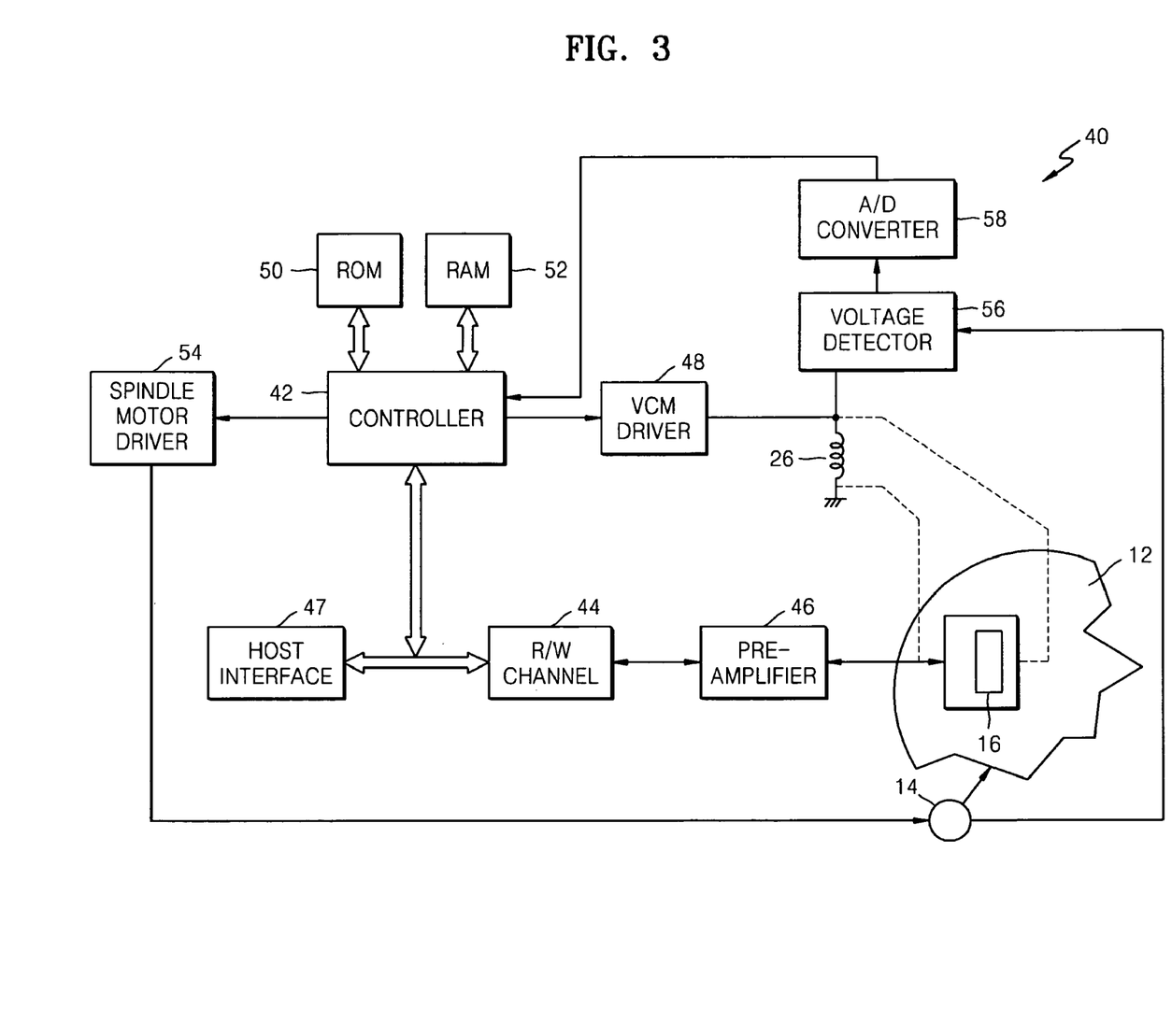
FIG. 3 shows a circuit diagram of an electrical system of controlling the disc drive shown in FIG. 2.

FIG. 3 shows a circuit diagram of an electrical system of controlling the disc drive shown in FIG. 2. An electrical system 40 includes a read/write (R/W) channel 44 and a controller 42 coupled with the transducer 16 by a pre-amplifier 46. The controller 42 includes a digital signal processor (DSP), a microprocessor, and a microcontroller. The controller 42 applies a control signal to the R/W channel 44 so as to read and write information from and on the disc 12. Information is transmitted to a host interface 47 from the R/W channel 44. The host interface 47 includes a buffer memory to allow the disc drive and a control circuit to interface with a system, such as a personal computer (PC).

Also, the controller 42 is coupled with a VCM driver 48 which supplies driving current to the voice coil 26. The controller 42 applies a control signal to the VCM driver 48 to control excitation of the VCM 30 and movement of the transducer 16.

In a read mode, the R/W channel 44 converts an analog signal read by the transducer 16 and amplified by the pre-amplifier 46 into a digital signal that may be read by a host computer (not shown), outputs the digital signal to the host interface 47, and receives user data output from the host computer from the host interface 47. In a write mode, the R/W channel 44 converts the user data into a recording current which may be written in the disc 12, and outputs the recording current to the pre-amplifier 46.

The controller 42 is also coupled with a read only memory (ROM) element or a nonvolatile memory element, such as a flash memory element 50, and a random access memory element 52. The memory elements 50 and 52 include a command used by the controller 42 and data so as to execute a software routine. The software routine includes the seek routine on which the transducer 16 is moved from one track to another track. The seek routine includes a servo control routine during which the transducer 16 is moved to a correct track.

Figure 4:
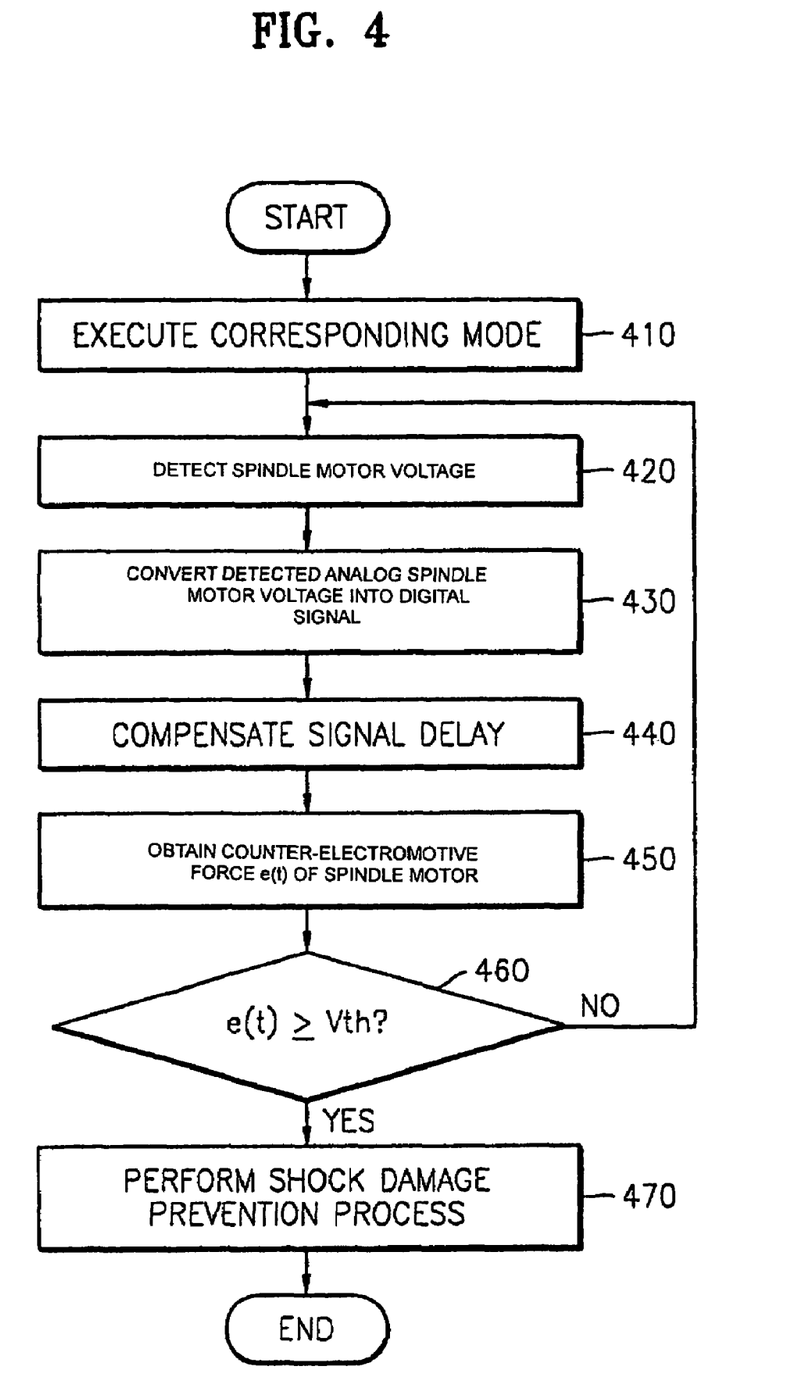
FIG. 4 shows a flowchart illustrating a method of controlling the disc drive using a counter-electromotive force according to an embodiment of the present invention.

Also, programs as described in the flowcharts illustrating a method of controlling a disc drive using a counter-electromotive force as shown in FIG. 4 of the present invention, are stored in the memory elements 50 and 52.

In order to perform an operation of a counter-electromotive force using a spindle motor voltage, according to an embodiment of the present invention, a voltage detector 56, which detects the spindle motor voltage, and an analog/digital (A/D) converter 58, which converts the detected spindle motor voltage into a digital signal, are provided. The controller 42 is designed to perform a shock damage prevention process by controlling the VCM 30 and the spindle motor 14 so that a current mode is stopped and a parking or unloading mode is executed if a counter-electromotive force operation process to perform an operation of a value of the counter-electromotive force using the voltage detected from the spindle motor and the value of the counter-electromotive force, of which operation is performed in the counter-electromotive force operation process, are equal to or larger than a predetermined threshold value. Preferably, the voltage detector 56 is designed to include an amplifier and a filter to attenuate noise, because a signal detected using the counter-electromotive force is very small.

In addition, a delay time may occur between a driving signal output from a spindle motor driver 54 and a signal detected from the spindle motor 14. Thus, in order to calculate correct counter-electromotive force, it is effective that a circuit to compensate for signal delay between the driving signal and a voltage detection signal from the spindle motor 14 is installed.

Hereinafter, a method of controlling a disc drive using a counter-electromotive force according to the present invention will be described in detail.

First, a principle of the counter-electromotive force generated in the spindle motor by disturbance is as follows. When disturbance, such as an external vibration or an external shock, makes a fine vibration in a uniform magnetic force, the counter-electromotive force is thereby generated. Specifically, the spindle motor driving system includes a non-rotating portion and a rotating portion. A disk is installed on the rotating portion. When an external interference is applied to the spindle motor driving system, while the spindle motor is rotating, a displacement is generated in the rotating portion so that the torque and rotation velocity thereof change. Such a change instantly changes the current applied to the spindle motor according to the control process of the spindle motor. Thus, referring to Equation 1, it can be seen that the counter-electromotive force is generated when the current applied to the spindle motor changes.

A method of obtaining the counter-electromotive force includes using a spindle motor voltage and using a position error signal.

First, a method of controlling a disc drive using a counter-electromotive force according to the embodiment of the present invention using a spindle motor voltage will be described with reference to the flowchart of FIG. 4.

In operation 410, the controller 42 determines commands input to the host interface 47 and executes a corresponding mode. As an example, the controller 42 executes a loading mode, a seek mode, a track following mode, a read mode, and a write mode according to the commands.

In operation 420, a voltage is detected from the spindle motor 14 while a current mode is executed. In operation 430, the detected analog spindle motor voltage is converted into a digital signal.

However, a delay time may occur between a driving signal output from the spindle motor driver 54 and a signal detected from the spindle motor 14. Thus, in order to calculate a correct counter-electromotive force, in operation 440, the delay between the driving signal and the voltage detection signal of the spindle motor 14 is compensated by a delay circuit (not shown) installed in the controller 42.

In operation 450, a counter-electromotive force e(t) of the spindle motor 14 is obtained by Equation 1.

$$e(t) = v(t) - L \times \left(\frac{di}{dt}\right) - R \times i(t) \qquad (1)$$

Here, v(t) is a voltage detected from a spindle motor, L is a reactance constant of the spindle motor, R is a resistance of the spindle motor, and i is current applied to the spindle motor.

Next, in operation 460, the value of the counter-electromotive force of which the operation is performed in operation 450 is compared with a threshold Vth. Here, the threshold Vth is statistically determined by a maximum magnitude of a shock or the magnitude of vibration within a tolerance range of the system, according to a correlation between the counter-electromotive force and the magnitude of shock through experiments. That is, the threshold Vth is obtained from a regression function defined between an external shock or the magnitude of vibration and a spindle motor counter-electromotive force from the correlation.

When the value of the operated counter-electromotive force is smaller than the threshold Vth as a result of comparison in operation 460, this case corresponds to the magnitude of shock or the magnitude of vibration within a tolerance range of the disc drive. Thus, a current mode is normally executed, returns to operation 420, an operation is iteratively performed on the value of the counter-electromotive force, and then the value of the counter-electromotive force is compared with the threshold Vth.

If the value of the operated counter-electromotive force is equal to or larger than the threshold Vth as a result of comparison in operation 460, the magnitude of an external shock or the magnitude of shock determined by the value of the operated counter-electromotive force exceeds the tolerance range of the disc drive. Thus, in operation 470, in order to prevent damages of the transducer and the disc due to collision with the transducer and the disc, a shock damage prevention process of controlling the VCM and the spindle motor is performed so that the current mode is stopped and a parking or unloading mode is executed. This is because it takes a predetermined time for disturbance to spread. Thus, the disturbance is prevented from being transferred to the transducer and the disc and from making a bad effect on the function of the disc drive.

The present invention may be implemented by a method, an apparatus, and a system. When the present invention is implemented with a software unit, elements of the present invention are code segments to perform essential works. Programs or code segments may be stored in a processor readable medium or transmitted in response to computer data signals coupled with a carrier wave in a transmission medium or communication networks. The processor readable medium includes a certain medium on which information may be stored or transmitted. The processor readable medium includes an electronic circuit, a semiconductor memory device, a ROM, a flash memory, an erasable ROM, a floppy disc, an optical disc, and a hard disc. The computer data signals include certain signals which may be transmitted on a transmission medium, such as electronic network channels, optical fibers, airs, electronic fields, and RF networks.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A method of controlling a disc drive using a counter-electromotive force, the method comprising:
  detecting a voltage from a spindle motor during a predetermined mode;
  performing an operation of the value of the counter-electromotive force using the spindle motor voltage;
  comparing the value of the counter-electromotive force operated with a predetermined threshold voltage; and
  when the value of the counter-electromotive force is equal to or larger than the predetermined threshold, instantaneously controlling a voice coil motor and the spindle motor so that a current mode is stopped and a parking or unloading mode is executed.

2. A method of controlling a disc drive using a counter-electromotive force, the method comprising:
  detecting a voltage from a spindle motor during a predetermined mode;
  performing an operation of the value of the counter-electromotive force using the spindle motor voltage;
  comparing the value of the counter-electromotive force operated with a predetermined threshold; and
  when the value of the counter-electromotive force is equal to or larger than the predetermined threshold, instantaneously controlling a voice coil motor and the spindle motor so that a current mode is stopped and a parking or unloading mode is executed,
  wherein the counter-electromotive force e(t) is obtained by:

$$e(t) = v(t) - L \times \left(\frac{di}{dt}\right) - R \times i(t)$$

where, v(t) is a voltage detected from the spindle motor, L is a reactance constant of the spindle motor, R is a resistance of the spindle motor, and i is current applied to the spindle motor.

3. The method as claimed in claim 1, wherein the predetermined mode is selected among a loading mode, a seek mode, a track following mode, a read mode, and a write mode.

4. A method of controlling a disc drive using a counter-electromotive force, the method comprising:
  detecting a voltage from a spindle motor during a predetermined mode;
  performing an operation of the value of the counter-electromotive force using the spindle motor voltage;
  comparing the value of the counter-electromotive force operated with a predetermined threshold; and
  when the value of the counter-electromotive force is equal to or larger than the predetermined threshold, instantaneously controlling a voice coil motor and the spindle motor so that a current mode is stopped and a parking or unloading mode is executed,
  wherein the predetermined threshold is calculated from a regression function corresponding to a statistical correlation between the magnitude of an external shock and the counter-electromotive force.

5. A disc drive, comprising:
  a disc having a surface;
  a spindle motor to rotate the disc;
  a transducer to write and read information in and from the disc;
  a voice coil motor to move the transducer; and
  a controller to control the spindle motor and the voice coil motor according to a set mode, and to perform a shock damage prevention process of controlling the voice coil motor and the spindle motor, so that a current mode is instantaneously stopped and a parking or unloading mode is executed if a counter-electromotive force operation process of performing an operation of a value of a counter-electromotive force using a voltage detected from the spindle motor and the value of the counter-electromotive force are equal to or larger than a predetermined threshold voltage value.

6. A disc drive, comprising:
  a disc having a surface;
  a spindle motor to rotate the disc;
  a transducer to write and read information in and from the disc;
  a voice coil motor to move the transducer; and
  a controller to control the spindle motor and the voice coil motor according to a set mode, and to perform a shock damage prevention process of controlling the voice coil motor and the spindle motor, so that a current mode is instantaneously stopped and a parking or unloading mode is executed if a counter-electromotive force operation process of performing an operation of a value of a counter-electromotive force using a voltage detected from the spindle motor and the value of the counter-electromotive force are equal to or larger than a predetermined threshold value, wherein the counter-electromotive force e(t) is obtained by:

$$e(t) = v(t) - L \times \left(\frac{di}{dt}\right) - R \times i(t)$$

where, v(t) is a voltage detected from the spindle motor, L is a reactance constant of the spindle motor, and R is a resistance of the spindle motor, and i is current applied to the spindle motor.

7. The disc drive as claimed in claim 5, wherein the predetermined mode is selected among a loading mode, a seek mode, a track following mode, a read mode, and a write mode.

8. A disc drive, comprising:
a disc having a surface;
a spindle motor to rotate the disc;
a transducer to write and read information in and from the disc;
a voice coil motor to move the transducer; and
a controller to control the spindle motor and the voice coil motor according to a set mode, and to perform a shock damage prevention process of controlling the voice coil motor and the spindle motor, so that a current mode is instantaneously stopped and a parking or unloading mode is executed if a counter-electromotive force operation process of performing an operation of a value of a counter-electromotive force using a voltage detected from the spindle motor and the value of the counter-electromotive force are equal to or larger than a predetermined threshold value, wherein the predetermined threshold is calculated from a regression function corresponding to a statistical correlation between the magnitude of an external shock and the counter-electromotive force.

9. A disc drive, comprising:
a disc having a surface;
a spindle motor to rotate the disc;
a transducer to write and read information in and from the disc;
a voice coil motor to move the transducer; and
a controller to control the spindle motor and the voice coil motor according to a set mode, and to perform a shock damage prevention process of controlling the voice coil motor and the spindle motor, so that a current mode is instantaneously stopped and a parking or unloading mode is executed if a counter-electromotive force operation process of performing an operation of a value of a counter-electromotive force using a voltage detected from the spindle motor and the value of the counter-electromotive force are equal to or larger than a predetermined threshold value,
wherein the controller further comprises:
a circuit to compensate signal delay between a driving signal to drive the spindle motor and a voltage detection signal from the spindle motor.

10. A computer readable storage medium encoded with processing instructions for causing a computer to perform a method of controlling a disc drive using a counter-electromotive force according to a process comprising:
detecting a voltage from a spindle motor during a predetermined mode;
performing an operation of the value of the counter-electromotive force using the spindle motor voltage;
comparing the value of the counter-electromotive force operated with a predetermined threshold; and
when the value of the counter-electromotive force is equal to or larger than the predetermined threshold voltage, instantaneously controlling a voice coil motor and the spindle motor so that a current mode is stopped and a parking or unloading mode is executed.

11. The computer readable storage medium as claimed in claim 10, wherein the counter-electromotive force e(t) is obtained by:

$$e(t) = v(t) - L \times \left(\frac{di}{dt}\right) - R \times i(t)$$

where, v(t) is a voltage detected from the spindle motor, L is a reactance constant of the spindle motor, R is a resistance of the spindle motor, and i is current applied to the spindle motor.

12. The computer readable storage medium as claimed in claim 10, wherein the predetermined mode is selected among a loading mode, a seek mode, a track following mode, a read mode, and a write mode.

13. The computer readable storage medium as claimed in claim 10, wherein the predetermined threshold is calculated from a regression function corresponding to a statistical correlation between the magnitude of an external shock and the counter-electromotive force.

14. A method of controlling a disc drive having a transducer and a disc by using a counter-electromotive force, the method comprising:
calculating the counter-electromotive force using a spindle motor voltage or a position error signal without installing an additional shock sensor to sense disturbance in the disc drive;
determining a magnitude of an external shock or a magnitude of vibration by the calculated counter-electromotive force; and
when the magnitude of an external shock or the magnitude of vibration determined by the counter-electromotive force exceeds a tolerance range of the disc drive, instantaneously controlling the disc drive so that a current mode is automatically converted into a parking or unloading mode, preventing malfunctions of the disc drive due to collisions between the transducer and the disc.

15. The method as claimed in claim 1, wherein the predetermined mode is selected among a seek mode, a track following mode, a read mode and a work mode.

16. The method as claimed in claim 1, wherein the instantaneously controlling comprises controlling without a count operation.

* * * * *